(No Model.)

W. S. G. BAKER.
CAR WHEEL.

No. 302,818. Patented July 29, 1884.

Witnesses
Wm. A. Skinkle.
Robert E. Nash.

Inventor
William S. G. Baker
By his Attorneys
Baldwin, Hopkins & Peyton

United States Patent Office.

WILLIAM S. G. BAKER, OF BALTIMORE, MARYLAND.

CAR-WHEEL.

SPECIFICATION forming part of Letters Patent No. 302,818, dated July 29, 1884.

Application filed June 2, 1884. (No model.)

*To all whom it may concern:*

Be it known that I, WILLIAM S. G. BAKER, of Baltimore city, in the State of Maryland, have invented certain new and useful Improvements in Car-Wheels, of which the following is a specification, reference being had to the accompanying drawings, in which—

Figure 1:
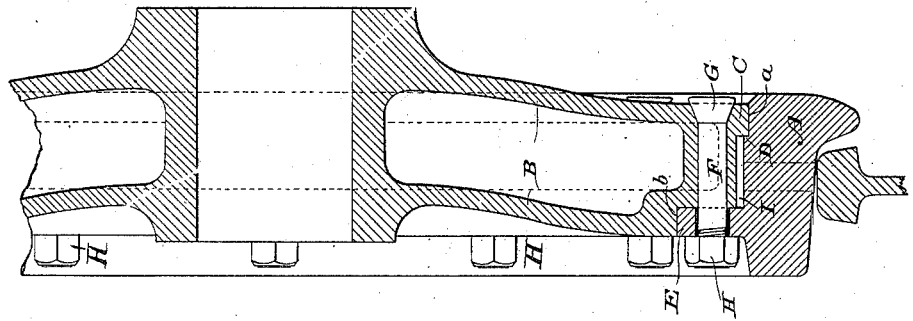
Figure 2:
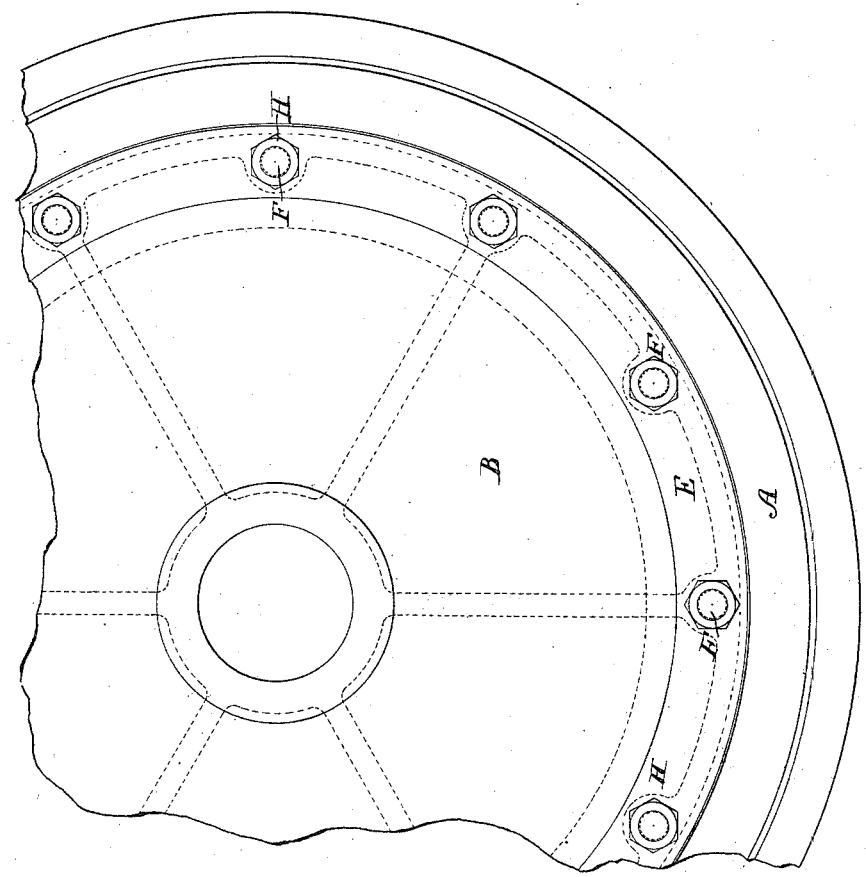

Figure 1 is a diametrical section, and Fig. 2 a side view, of part of a car-wheel embodying my improvements.

The object of my invention is to provide an improved car-wheel in which the tire and body of the wheel are made of separate parts and are properly joined together, so that the tire shall be supported by the body upon its opposite inner edges, and not all along its inner surface, whereby whatever yielding or resilient quality there is in the tire will be suitably available for diminishing jars and shocks in the practical use of the wheel. Such jars and shocks, it is well known, are very great in practice where heavily-loaded cars are driven at high speed, resulting, if not in immediate breakage, in deteriorating the condition of the metal composing the car-wheel so as to weaken it and render it liable to ultimately break.

I am aware that it is not new, broadly speaking, to support a car-wheel tire upon its opposite inner edges upon the body of the wheel, and I do not claim that, broadly, my improvements being of the character which I will now explain in detail by reference to the letters upon the drawings, and then succinctly specify in my claim.

A indicates the tire, and B the body, of the wheel, which latter is preferably cast hollow, as indicated, or may have hollow spokes, or be made in any usual and approved manner in the middle body part.

C indicates a peripheral extension or annular projection of the car-wheel body, upon which the tire is seated at one side, as indicated in Fig. 1, where D indicates a shoulder against which the annular part C bears upon one side.

E indicates an annular inward projection or tire-ring, which fits in a corresponding annular recess or cut-away part in the body of the wheel, as well shown in Fig. 1.

F indicates a bolt which passes through the ring, and which is preferably headed or inclined at its end G, as shown, and fits in a corresponding hole in the car-wheel body. This bolt is made of less diameter than its hole through the ring, and is preferably held in place by a screw-nut, H. All the other bolts connecting the tire and body of the wheel are similarly constructed, and so are the parts through which they pass, and which they serve to secure together. An annular recess, I, it will be observed, is left between the center of the tire and the body of the wheel, the tire being supported upon the body at points $a\,b$, as shown in Fig. 1, the internal tire-ring being the only part of the tire through which the bolts for fastening the tire and body together pass. This recess enables the tire to yield slightly, but materially for practical purposes, in its center, where the weight upon the rail bears. The openings through the tire ring for the bolts being larger than the diameter of the bolts, relieves them from strain and prevents them from breaking.

I am aware that this is not broadly new; but it is a useful feature which I employ in connection with others in my improved car-wheel. Such a car-wheel as illustrated is economical and convenient to construct and easy to repair, and is exceedingly serviceable in practice, on account of the improved construction explained.

Having thus described a car-wheel embodying my invention, what I claim to be new, and desire to secure by Letters Patent of the United States, is—

In a car-wheel composed of a separate tire and body part, the combination of the tire having a single tire-ring with bolt-holes through it, with a body part provided with corresponding bolt-holes, and a recess upon one side and a projection upon the other, whereby the tire is seated upon its opposite inner edges upon the body of the wheel at points $a\,b$, and a recess, I, is left between the central portion of the tire and the central portion of the body, substantially as set forth.

In testimony whereof I have hereunto subscribed my name.

WM. S. G. BAKER.

Witnesses:
 MARCUS S. HOPKINS,
 C. W. KOHLMANN.